US008458167B2

(12) United States Patent
Lohman et al.

(10) Patent No.: US 8,458,167 B2
(45) Date of Patent: Jun. 4, 2013

(54) CLIENT-BASED INDEX ADVISOR

(75) Inventors: Guy Maring Lohman, San Jose, CA (US); Lin Qiao, San Jose, CA (US); Sandeep Tata, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 341 days.

(21) Appl. No.: 12/416,208

(22) Filed: Apr. 1, 2009

(65) Prior Publication Data
US 2010/0257151 A1  Oct. 7, 2010

(51) Int. Cl.
*G06F 17/30* (2006.01)

(52) U.S. Cl.
USPC .......................................... 707/715; 707/686

(58) Field of Classification Search
USPC ............................................................ 707/696
See application file for complete search history.

(56) References Cited

U.S. PATENT DOCUMENTS

| | | | | |
|---|---|---|---|---|
| 5,960,423 | A * | 9/1999 | Chaudhuri et al. | 707/715 |
| 6,266,658 | B1 * | 7/2001 | Adya et al. | 1/1 |
| 6,801,903 | B2 * | 10/2004 | Brown et al. | 1/1 |
| 6,847,963 | B1 | 1/2005 | Paclat | |
| 6,912,547 | B2 * | 6/2005 | Chaudhuri et al. | 707/693 |
| 6,934,701 | B1 * | 8/2005 | Hall, Jr. | 1/1 |
| 7,155,459 | B2 * | 12/2006 | Chaudhuri et al. | 1/1 |
| 7,272,589 | B1 * | 9/2007 | Guay et al. | 707/716 |
| 7,406,477 | B2 * | 7/2008 | Farrar et al. | 1/1 |
| 7,499,907 | B2 * | 3/2009 | Brown et al. | 1/1 |
| 7,747,606 | B2 * | 6/2010 | Dageville et al. | 707/713 |
| 2005/0203940 | A1 * | 9/2005 | Farrar et al. | 707/102 |

OTHER PUBLICATIONS

Zilio et al., DB2 Design Advisor: Integrated Automatic Physical Database Design, Proceedings of the 30th VLDB Conference, Toronto, Canada, 2004, p. 1087-1097.*
Chaudhuri & Narasayya, An Efficient, cost-Driven Index Selection Tool for Microsoft SQL Server, Proceeding of the 23rd VLDB Conference Athens, Greece, p. 146-155 (Published 1997).*
Valentin et. al, DB2 Advisor: An Optimizer Smart Enough to Recommend Its Own Indexes, Proceedings, 16th International Conference on.*
Valentin et. al, DB2 Advisor: An Optimizer Smart Enough to Recommend Its Own Indexes, Proceedings, 16th International Conference on Data Engineering, 2000, p. 101-110 (Published Aug. 6, 2002).*
Tian-Lei Hu et al., "Collaborative Agents Supported Automatic Physical Database Design Based on Description Logics Reasoning," Proceedings of the 10th Int'l Conf. on CSCWD, Nanjing, China, May 3-5, 2006, 6pgs.

(Continued)

*Primary Examiner* — Don Wong
*Assistant Examiner* — Theodore Hebert
(74) *Attorney, Agent, or Firm* — IP Authority, LLC; Ramraj Soundararajan

(57) ABSTRACT

A common interface to manage heterogeneous databases and develop enterprise class applications is provided. In particular, it is shown that a client-based system and method can: (a) provide a uniform interface for the DBA or the application developer to use across all the database deployments, (b) provide flexibility in the number and kinds of scenarios it can be used, and finally (c) reduce the total cost of ownership for the enterprise.

3 Claims, 2 Drawing Sheets

OTHER PUBLICATIONS

Sandeep Tata et al., "On Common Tools for Databases—The Case for a Client-based Index Advisor," Proceedings of the 24th ICDEW, Cancun, Mexico, Apr. 7-12, 2008, pp. 42-49.

Kai-Uwe Sattler et al., "Quiet: Continuous Query-Driven Index Tuning," Proceedings of the 29th Int'l Conf. on VLDB, V29, Berlin, Germany, Sep. 9-12, 2003, pp. 1129-1132.

Daniel Zilio et al., "Self-Managing Technology in IBM DB2 Universal Database," Proceedings of the 2001 ACM Int'l CIKM, Atlanta, Georgia, USA, Nov. 5-10, 2001, pp. 541-543.

Mirella Moro et al., "Schema Advisor for Hybrid Relational-XML DBMS," Proceedings of the 2007 ACM Int'l SIGMOD, Beijing, China, Jun. 12-14, 2007, pp. 959-970.

* cited by examiner

CLIENT-BASED INDEX ADVISOR

BACKGROUND OF THE INVENTION

1. Field of Invention

The present invention relates generally to the field of databases. More specifically, the present invention is related to a client-based index advisor.

2. Discussion of Related Art

Modern enterprises today deploy several different databases from multiple vendors to support a variety of applications. The task of managing a heterogeneous mix of database servers and supporting different applications is a daunting task indeed. The autonomic computing initiatives from the major database vendors have provided tools that help DBAs in this task. These tools come in the form of advisors that help the DBA figure out what indexes to build, how to partition the tables, what materialized views to build, and what type of statistics to maintain. These tools are extremely powerful and can be used to great effect by experienced DBAs. However, to a certain extent, the proliferation of these tools has shifted the complexity of managing these databases to understanding the vagaries of these individual tools, their interfaces, and their semantics.

The problem of index selection has been studied in much detail, and many major database vendors provide support for automating this task. Although the details of the approaches taken by the different vendors vary, the essential strategy is to enumerate possible indexes and evaluate the impact of adding that index on the workload using the optimizer's cost model. Approaches such as the one outlined in the paper to Bruno et al. titled "Automatic physical database tuning: A relaxation-based approach" and the paper to Papadomanolakis et al. titled "Efficient use of the query optimizer for automated database design" describe techniques that make the enumeration and evaluation process more efficient by reusing computation and minimizing expensive invocations of the optimizer. The sometimes difficult task of detecting when the index advisor might provide large performance gains has been addressed in the paper to Bruno et al. titled "To tune or not to tune?: a lightweight physical design alerter". In many real situations, a detailed workload profile is difficult to collect.

SUMMARY OF THE INVENTION

A client-based index advisor is disclosed, wherein the client-based advisor uses a set of heuristics to examine the schema, data, statistics, and the workload (independently) to arrive at a set of recommendations. This is done even when the data server in question does not have an inbuilt index advisor. However, when such an index advisor is available, the tool can leverage it to obtain recommendations that are based on the cost model of the optimizer. Using such a client-based index advisor allows an enterprise to use one tool across all data servers it owns. The tool provides a different quality of recommendation based on the level of support available for an external advisor.

The present invention provides a computer based system and method to complement a server-based index adviser with a client-based index advisor, wherein the method, first, determines a level of support from a server associated with a database management system (DBMS), wherein the level of support is picked from any of the following: DBMS with no index advisor support, DBMS with a native index advisor and no external virtual index support, or DBMS with a native index advisor and with an external virtual index support. For the case of the DBMS with no index advisor support, the present invention's method recommends at least one potential index based on heuristics. For the case of DBMS with a native index advisor and no external virtual index support, the present invention's method recommends at least one potential index based on invoking the native index advisor. For the case of DBMS with index advisor and with an external virtual index support, the present invention's method recommends at least one potential index based on enumerating sets of potential indexes and estimating a cost of a workload.

Furthermore, an embodiment of the present invention also provides for a computer program product having computer readable program code which, when executed by a computer, implements the steps of the above-mentioned method.

In one embodiment, the heuristics comprises a plurality of rules, and the method further comprises the steps of: incrementing a score when a rule matches a candidate index, summing up scores for each index, and sorting indexes in decreasing order of score, and limiting recommended indexes to indexes with a score above a predetermined cut-off.

In one embodiment, the method further comprises the steps of: collecting workload information from a workload monitoring tool including frequencies, collecting statistics on potential performance benefits of building a set of recommended indexes using the native index advisor based on the collected workload information, and recommending at least one potential index based on the collected statistics.

In one embodiment, enumeration is done via a simple indexes first with interactions algorithm, wherein, a best index set for an entire workload is identified using a Greedy-(2-k) enumeration algorithm, and after recommending all single column indexes, proceeding to list possible multi-column indexes using columns recommended in the first pass.

In one embodiment, enumeration is done via a best indexes first algorithm, wherein, for each query, the method comprises: locating useful indexes, explaining a cost of each query with existing indexes, re-explaining the cost of each query with all candidate indexes, computing a cost benefit ratio of each index, wherein these steps are repeated for every query in the workload and the cost benefit ratio of the indexes is updated, and indexes are sorted by cost benefit ratio and best ones are picked until the disk space is exhausted.

In one embodiment, enumeration is done via a best indexes first, remove recommendations and repeat algorithm, wherein, for each query, the method comprises the steps of: running the optimizer to locate next best choices after finding recommended indexes, wherein this is done up to k times to locate the top k choices of the optimizer.

In one embodiment, enumeration is done via a try variations algorithm, wherein from a set of best indexes, a small subset is swapped out for indexes with a lower cost benefit ratio, and if the new set has a better overall cost, it is retained, otherwise, it is discarded.

In one embodiment, enumeration is done via a house cleaning algorithm, wherein the method comprises the steps of: storing indexes in decreasing order of size or, if available, increasing order of frequency of use, and examining cost by dropping an index, and cycling through all indexes, or as many as possible within a predetermined time, identifying indexes having lowest impact on workload execution time, and recommending dropping identified indexes having lowest impact.

DESCRIPTION OF THE PREFERRED EMBODIMENTS

Figure 1:
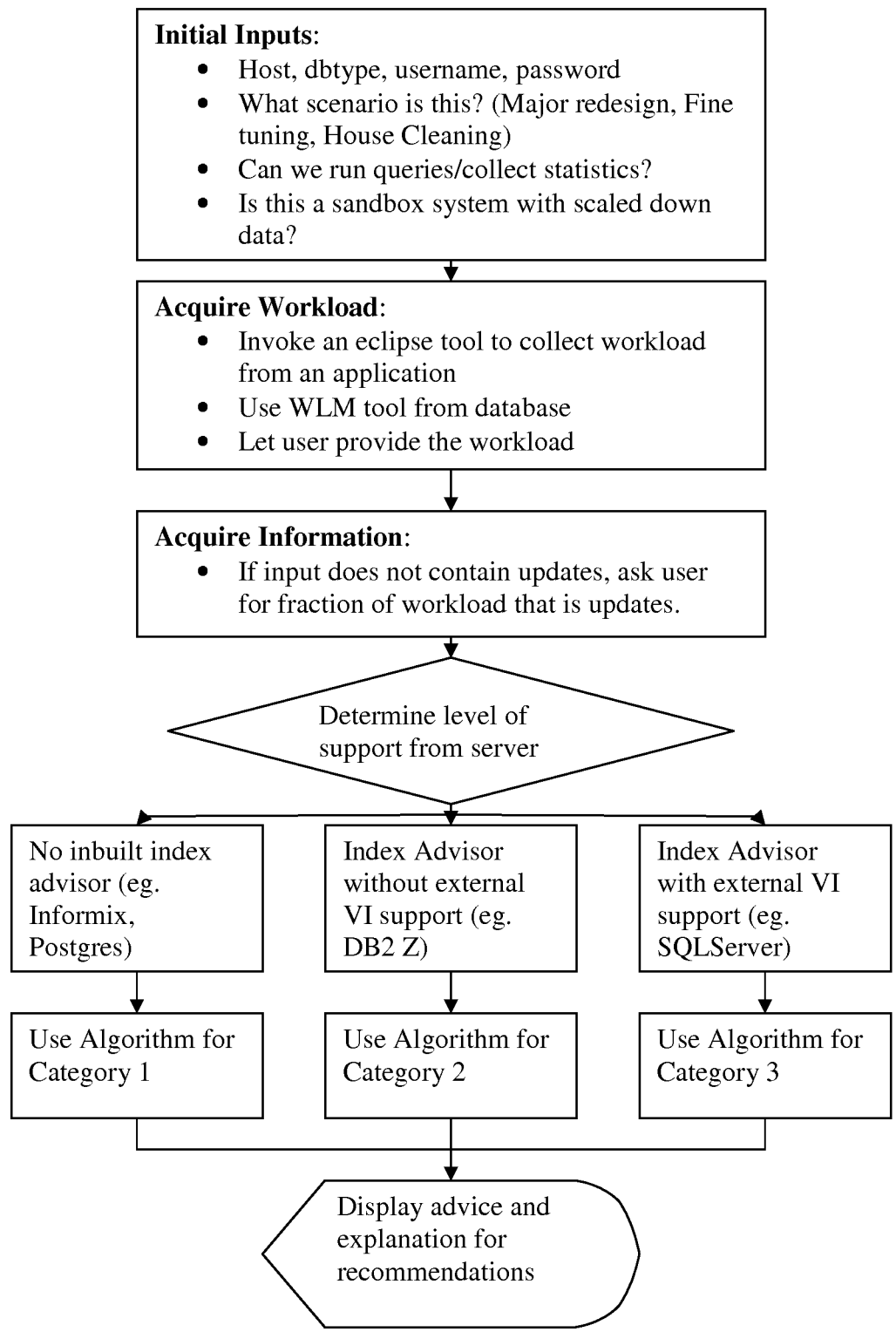
FIG. 1 illustrates a flow chart associated with a method of the present invention.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

The present invention focuses on one such tool—the index advisor. The present invention's client-based index advisor aims to provide a uniform interface across different databases irrespective of the support offered by the database for an index advisor. The design derives from the need for the advisor to take advantage of partial information that is available at different time points during the life cycle of an enterprise application (design, develop, test, and deploy). An index advisor based on such a design can be extremely valuable to the DBA in a large enterprise in the following ways:

- a client-based index advisor would provide a uniform interface to the different database servers in the enterprise, thereby making it easier to use, manage, and tune them,
- by not depending on special features (or "hooks") in the server, this advisor can be used with databases that do not have a built-in advisor, and
- by using an index advisor in the application design phase, the advisor might be able to exploit application-specific data that could have an impact on the recommended set of indexes.

It is noted here that it is not expected that such an index advisor will replace server specific index advisors. In the prior art, it was observed that the tight integration of the index advisor with the database server and the optimization logic enabled accurate cost estimates which in turn led to high quality index recommendations. The performance of current server-specific index advisors is not expected to improve. Instead, the present invention's index advisor is a useful complement to the server-based index advisors. The client-based index advisor would of course be useful if the server did not have a built-in index advisor. However, the present invention's index advisor is useful in several scenarios with incomplete information where traditional index advisors are not applicable. In addition, by being client-based, the present invention's index advisor can be integrated with an IDE such as Eclipse and be available to the application developer also. Therefore, the present invention's client-based index advisor augments server-based index advisors to better cover situations not adequately dealt with by server-based tools. According to the present invention's design, the server specific index advisor is invoked if it is available and appropriate for the task at hand. The client-based design aims to make it possible to leverage the available information (complete or incomplete) using the best available techniques.

Server-based index advisors usually work by using the following three steps: (1) enumerate sets of candidate indexes, (2) estimate the performance on a given workload by directing the optimizer to use "virtual" candidate indexes, and (3) recommend the virtual indexes that the optimizer finds useful.

This seemingly simple task is rendered extremely challenging by the fact that exhaustively enumerating all possible sets of single-column and multi-column candidate indexes is computationally infeasible for large workloads. Efficiently searching the space of possible indexes is a very difficult problem. Various heuristics are used to enumerate candidate indexes that are relevant to the workload. For instance, the predicates and the join columns used in the queries are good candidate for indexes. Often, these heuristics take advantage of deep knowledge about the peculiarities of the optimizer and are not likely to work well when used in the context of a different optimizer. Secondly, actually building each candidate index is clearly infeasible. The database usually provides a mechanism to create a virtual index by adding an entry in the catalog with the relevant statistics so that the optimizer can be made to use these indexes while enumerating query plans. By allowing the optimizer to provide the estimated cost, it is made sure that the recommended indexes that are built will actually get used by the optimizer. Finally, in order for the optimizer to provide accurate estimates, it may have access to appropriate statistics on the base data as well as reasonable estimates on the properties of the virtual indexes. Estimating the statistical properties of the index (such as size, skew) without actually building the index is a non-trivial task. Given a comprehensive workload, the ability to create virtual indexes, and the appropriate statistics, existing index advisors can provide very good recommendations in a short amount of time. In practice, however, some of these pieces of information are either missing or incomplete. The present invention's client-based index advisor targets these cases, and in some cases exploits application-specific information to complement the existing pieces of data.

Existing approaches are server-specific. This allows them to make sure that the recommended indexes are in agreement with the optimizer (ensuring that the optimizer actually ends up using them). The present invention's approach is server-independent in the sense that the server-based advisor is exploited, when possible, and server-independent heuristics are used, otherwise. Further, the present invention's design uses different approaches for different scenarios (e.g. different enumeration algorithms) and proposes to take advantage of partial information.

Scenarios

Several use-case scenarios are described for the index advisor. Table 1 presents various use cases divided into two main categories.

TABLE 1

| | | Use-Case Scenarios | | |
| | | Information Available | | |
| No. | Scenario | Workload | Statistics | Expectations |
| --- | --- | --- | --- | --- |
| | | Application Developer/DBA | | |
| D1 | Application development | Many app SQL, no frequency | Synthetic data | Simple |
| D2 | Application tuning | App SQL, some frequency | Synthetic data | Indexes based on little statistical data |

TABLE 1-continued

Use-Case Scenarios
Information Available

| No. | Scenario | Workload | Statistics | Expectations |
|---|---|---|---|---|
| D3 | Application redesign and enhancement | Old SQL, some new SQL | Real data or synthetic data | Incremental recommendations |
| | | Enterprise DBA | | |
| A1 | Database physical design | Preliminary | Basic (table cardinalities) | Simple |
| A2 | New application deployment | Many SQL, no frequency | Some real data and statistics | Basic |
| A3 | Revised application deployment | Old SQL, frequencies updates | Old data, statistics | Incremental |
| A4 | Fine tuning | SQL frequencies, updates | All data and statistics | Few new indexes |
| A5 | Problem determination | SQL frequencies, updates | All data and statistics | Improve problem SQL |
| A6 | House cleaning | SQL frequencies, updates | All data and statistics | Drop unnecessary indexes |
| A7 | Performance redesign | SQL frequencies, updates | All data and statistics | Major redesign of indexes |
| A8 | Server upgrade | SQL frequencies, updates | All data and statistics | Maintain same or better performance |

The first category (cases D1 through D3) lists the scenarios for which an application developer (or an application DBA) might find use for an index advisor. The second category (cases A1 through A8) list the possible scenarios for which an index advisor might be useful to the enterprise DBA. In each of these scenarios, the table lists three crucial pieces of information:

Workload—What workload information is available? Is access to the full SQL profile (the queries, and their frequencies) available? Is the frequency of updates known?

Statistics—Are query optimization statistics available? Is access to base data available to collect statistics?

Expectation—What is the desired recommendation? Does the user expect the advisor to recommend small changes—that is, a few additional indexes that might improve performance? Or does the user expect a major redesign of the physical structures?

With a fine-grained analysis of the use cases given in this table, it is shown that there are some scenarios for which current index advisors are not ideally suited. This analysis also serves to map out the problem space and help tailor the present invention's design to better solve the problems that are not addressed by current index advisors. Some of these cases are describe below:

D1—During application development, the physical design of the databases is more or less fixed. Access to the entire workload information is usually not available; many of the SQL queries are available, but their relative frequencies are not available. Since the database is unlikely to be fully populated with the real data, only access to statistics based on synthetic or scaled down data is available. Since the application developer focuses more on correctness rather than performance in the early phases, the expectations from the index advisor are likely to be simple. It is advantageous for the index advisor to be able to take advantage of the partial information to provide basic recommendations.

D2—For the application tuning phase, it is likely that more information on the workload and statistics is available. Application DBAs often test their application on a sandbox before deploying it on a production system. However, only access to the application-specific workload is available, and not the database's overall workload. The application DBA at this point wants to generate the best possible set of indexes for this application, based on local workload and statistics from sample data.

D3—The case in which an existing application that has been redesigned and enhanced is being tested and tuned is different from that of a new application. In this case, real workload information and statistics are often available. However, depending on the extent of revisions to the application, the application DBA might either want to pay deference to the existing set of indexes on the production database and look for advice on additional indexes that might complement the existing ones. For major redesigns, one might want a completely new set of indexes recommended.

A1—During the physical design of the database, only very preliminary information on the workload (such as OLTP or OLAP) is available. Preliminary statistics might be gathered from data that is not yet loaded into tables, such as relative table cardinalities. Indexes are usually not expected from a performance point of view at this stage. However, the DBA might find it useful to get general recommendations based on the preliminary information.

A2—Deploying a new application is one of the more challenging tasks that the DBA faces. While the DBA can collect information on all the SQL that might be executed, he often does not have all the frequency information of the application SQL yet. However, the DBA has access to the overall workload information including the frequencies. At this point, the DBA expects the index advisor to use the existing information to recommend the best set of indexes that provide the application with good initial performance while not affecting other applications (much).

A3—The task of re-deploying an existing application that has been upgraded is again slightly different from the task of deploying a new application. The DBA might be able to take advantage of previous workload information. Moreover, the expectation here is that the revised application will perform no worse than the old version, while minimizing the impact on other applications.

A4—When the DBA is trying to fine tune an application, he usually has access to all the workload information, and the relevant statistics. At this point, he expects to get a few recommendations to add or drop a few indexes that might boost the application's performance.

A5—When the DBA encounters a particularly slow-running query or application, the task of speeding up this query (using indexes or other techniques) can be particularly challenging. The focus here is on improving the performance of a specific slow-running component.

A6—House cleaning is a process that enterprise DBAs perform regularly. This identifies indexes that are not useful anymore, so they can be dropped. Old indexes might not be useful if the workload changes significantly, applications get retired, or if the data gets modified significantly. The index advisor is expected to find indexes that can be dropped with minimal impact to the performance of different applications.

A7—Performance redesign is a major undertaking that involves a thorough redesign of the physical structures of the database. Workload and statistics information is available, but for this task, the DBA expects the index advisor to (perhaps completely) ignore the existing index design and suggest a new set of indexes that might lead to significantly better performance across all the applications.

A8—A Server upgrade is a fairly uncommon, yet important scenario. When a new version of a database server is available, the task of migrating all the applications and data to this sever while guaranteeing performance regression is daunting. The physical design structures that were useful on the first database may or may not be suitable on the new version. This case is similar to the performance redesign case, however the DBA might want to pay some deference to the existing index design so that he has some knowledge of the kinds of query plans that might be evaluated.

Current index advisors work best when they have a detailed knowledge of the workload (the queries, their frequencies, including updates) and when the optimization statistics are current and available. The output they produce is usually simply recommendations for additional indexes. A casual inspection of Table 1 shows that this is the case in only some scenarios (A4, A5, A7, A8). In all the other scenarios it is either awkward or very difficult to leverage existing server-based index advisors. To better understand the scenario space and the kinds of solutions that might be applicable, 4 major groups are defined based on the information available to the advisor:

Full Information (Cases A4 to A8) This is the case in which access to detailed information on the workload and optimization statistics is available. Partial Information (Cases A2 and A3) This is the case in which some information on the database as a whole is available, but only partial information about a new or redesigned application is available.

Application-Specific Information (Cases D2 and D3) Information about the entire workload is not available, but only application-specific details are available.

Minimal Information (Cases D1 and A1) Only preliminary, high-level information is available.

Another issue that is orthogonal to the use case scenarios described above is the support available to such a client-based index advisor from the database itself. Enterprises deploy a variety of databases ranging from commercial offerings with advanced tooling (e.g. IBM DB2 UDB) to open source products like MySQL and Postgres which do not usually offer an advanced set of tools.

FIG. 1 illustrates the user interaction and the determination of the various levels of support by the present invention's method. The support available from different database engines can be broadly classified into three levels in decreasing order of support:

1. DBMSs with index advisor and virtual index support: This is the case in which the database supports the ability to create virtual indexes and do "what-if" style analyses that estimate the cost of a given workload from the optimizer. This allows us to simply leverage the server-based index advisor when possible, and use the what-if infrastructure when required.

2. DBMSs with index advisor and no virtual index support: Some databases have an index advisor, but do not provide an interface that lets the DBA create virtual indexes and perform "what-if" analyses. In this case, the server-based index advisor may be invoked when appropriate. However, there is not as much flexibility here with exploring different options from the client as in the previous case.

3. DBMSs with no index advisor: There are many DBMSes that neither support a built-in index advisor nor support any infrastructure for virtual indexes. Examples in this category include open source databases like MySQL, Postgres, and Derby that are increasingly being used in enterprises for certain classes of applications.

Each of these three categories provides a unique set of challenges and opportunities for each of the use cases described. Several effective approaches are described for each of these cases.

Different strategies are used in each of the use cases based on the support available from the database. The space of possibilities is outlined in Table 2.

TABLE 2

|  | No Advisor | No VI Support | VI Support |
| --- | --- | --- | --- |
| Full Information | Workload, simple external cost model. | Invoke native index advisor | Use specific enumeration algorithms based on the use case, use given workload |
| Partial Information | Collect SQL from app, guess frequencies based on other user input, use simple external cost model and invoke native advisor with overall workload and SQL collected from application. | Collect frequencies from application and use native index advisor | Enumerate giving deference to indexes that support the existing applications |
| App-Specific Information | Use app-SQL, simple external cost model. | Invoke native index advisor with application workload | Use appropriate enumeration algorithm, use app-specific SQL |

TABLE 2-continued

| | No Advisor | No VI Support | VI Support |
|---|---|---|---|
| Minimal Information | Basic recommendation based on heuristics (e.g., OLTP vs. OLAP, Indentify join keys). | | |

The approach used at each level of support from the database is now described:

No Index Advisor: When the database does not have a built-in index advisor, a basic external cost model is used in that it makes minimal assumptions about the plans available to the optimizer in conjunction with some heuristics. Using a cost model helps us reason about the impact of adding an index in a more principled way than using only a heuristic-based approach. The downside however, is that the external cost model is likely to be different from the cost model inside the specific database and the optimizer could reject the indexes picked by the external model. The challenge here is to build an external model that is general enough that it will capture the similarities across the plans supported by a wide variety of databases while still offering a way to quantify the impact of indexes better than a heuristic based approach.

Index Advisor, No Virtual Index Support: When the database has an internal index advisor, but does not externalize the virtual index creation interface, the basic strategy used is to simply invoke the native index advisor with the appropriate workload. In cases where workload information is incomplete, SQL statements are collected from the application and are incorporated into the workload and submitted to the native index advisor.

Virtual Index Support: The case where a virtual index creation interface is externalized offers us the most degrees of freedom. Since the cost analysis comes directly from the optimizer that will choose the query plan, different enumeration algorithms can be aggressively tried. The basic idea in this case is that the space of possibilities that must be explored to solve the different problem scenarios listed in table 1 is different in each case. For instance, the enumeration algorithm that tries small changes from an existing set of indexes is completely different from the algorithm that is used to decide which indexes to drop. The freedom to choose an enumeration algorithm tailored to the scenario makes the client-based index advisor provide better recommendations than a server-based index advisor in this case.

The different approaches that fit the different levels of information available in each scenario are described below:

Minimal Information: The case of minimal information leaves us no possibilities other than heuristic based recommendations. For instance, existing techniques for discovering keys are exploited to recommend indexes on those columns. Similar techniques are available to predict which pairs of columns are likely to be used as join keys. Minimal statistical information is also taken advantage of, including information such as relative table cardinalities that might be available in these cases.

App-specific Information: Since the aim in this case is usually to obtain application specific performance tuning advice, the available workload information is used along with the available statistics and data. The heuristic techniques from the above case may also be used to supplement the application specific workload and statistics data.

Partial Information: In this case, when the application code is available, the SQL is extracted from the code and relative frequencies are guessed based on high level user input. Application specific workload information may be borrowed from earlier scenarios such as application tuning.

Full Information: This is the case that allows us the most freedom in terms of the algorithms that can be use to exploit all the data available. Different enumeration strategies are used where possible, and heuristics can be used based on complete information when an index advisor or virtual index infrastructure is not available.

The present invention's client-based index advisor has the ability to operate with multiple data-servers. The present invention's client-based index advisor is completely client based and does not depend on the release schedules of any of the servers nor for any modifications/code to be included in the server. The present invention's client-based index advisor is able to gracefully deal with missing information (e.g. lack of workload, lack of statistics) and can provide good advice and explain the reasons for making the suggestions. The present invention's client-based index advisor can work with data-servers that may or may not have their own index advisor. When the data-server has an index advisor, the client-based advisor takes advantage of it. The present invention's client-based index advisor is relatively easy to extend to handle a new data-server.

Data-servers are classified into three different groups based on the level of support they may provide to an index advisor tool and employ a different strategy for each case. The first group is where the data-server has no inbuilt index advisor capability at all. The second case is where the data-server has an index advisor, but it does not provide the ability for an external tool to create virtual indexes and obtain the cost of a query (or workload) using these virtual (and real) indexes. The third case is that of a data-server with an index advisor that also exports a way for an external tool to create a virtual index and obtain an estimate of the cost of query from the optimizer using all real and virtual indexes. In each category, the present design leverages the capabilities of the data-server to provide the best possible advice.

The design also employs an outside-in philosophy to examine the different use-case scenarios for an index advisor. It was discovered from interactions with consultants and experts in performance optimization that the index advisor is invoked with different expectations to solve problems in different situations. Current designs of index advisors do not differentiate between these scenarios and often run only one algorithm. This design is use-case aware and can provide a solution better tailored for the particular problem than existing index advisors that are not scenario aware.

Algorithms for different categories:

Category 1: No Native Index Advisor

The following algorithm (Recommend) runs several subroutines which award points to different potential indexes to be recommended. Finally, the candidates are sorted by the total points obtained and the top few are selected to be recommended.

Algorithm Recommend

1. R={ }
2. Run Schema Recommend (R)
3. Run Stats_Recommend (R)

4. If this is not a Sandbox, and queries on the system are allowed to be run, then
   a. Run Data Recommend (R)
5. Run Workload_Recommend (R)
6. Sort indexes in R by the score awarded to each index
7. Recommend indexes in R subject to the specified limit on the number of indexes per table Schema_Recommend This procedure uses only the information in the schema and several heuristic rules to make its recommendations
1. Scan the columns of each table, and award points for each of the following types with the reason "Index-friendly type"
   a. Integer (2), Small Int (2), date/time/timestamp(2), Double (2), varchar[420] (2), float/real (2), Char(1), BigInt (1), decimal/numeric (1), char[2-10] (1), varchar[21-40] (1)
2. No points awarded for graphic, vargraphic, BLOB, CLOB, DBCLOB, FORBIT, wide columns like varchar, long varchar of length>40,
3. Do not consider temporary tables for indexes. Volatile tables on the other hand may be considered.
4. If the table is range-partitioned, award 2 points for the column on which it is partitioned with the reason "Paritioned Column".
5. For DPF columns (Data Partitioning Feature), award 2 points with reason "DPF column"

Stats_Recommend

This procedure uses single column statistics to make decisions about column cardinality ordering and also make sampling based decisions cheaply. Note that a database created using db2look might have the statistics, but no actual data and possibly no workload information.
1. In each table, if column cardinality=table cardinality, it suggests that column may be a key column. Award 2 points with reason "Candidate Key"
2. Having discovered all potential candidate keys, if column X in table A has the same type and cardinality as a key column Y in table B, X might be a foreign key column. Award 2 additional points to Y with reason "Referenced by foreign key"
3. Index ranking: rank indexes according to the sorted single column cardinality.

The intuition is that a high column cardinality would imply that the column would admit very selective predicates so that an index scan will outperform table scan. Award 1 point if the cardinality is greater than 10. Award 2 points if cardinality is greater than 50 with reason "High column cardinality".

Data_Recommend

This procedure examines the data to make its recommendations. This is run only when the user allows queries on the data. This might not always be permitted if, for instance, this is a production system running at close to full load.
1. Discover all keys. Often, even primary keys are not declared by the DBA. An algorithm called GORDIAN (see paper to Sismanis et al. titled "GORDIAN: Efficient and Scalable Discovery of Composite Keys") can be used to efficiently discover all the composite keys in a database. Award 2 points for each discovered key as a "Candidate Key" (if this has not already been recommended using statistics alone in Stats_Recommend).
2. Discover all foreign keys. An algorithm called CORDS (see paper to Ilyas et al. titled "CORDS: Automatic Generation of Correlation Statistics in DB2") can be leveraged to discover all foreign key references that have not been explicitly declared. CORDS is an algorithm to efficiently find soft functional dependencies and correlations between column pairs. Award 2 points for the referenced keys with the reason "Potentially referred columns" and recommend them (Use sampling—CORDS).
3. Employ existing annotation techniques (Avatar) to recognize SSN, street addresses, and name columns. SSN, for instance, is a key. This gives us more confidence than a sampling based approach. Recommend these columns to be indexed based on recognition of the data type (configure the score awarded to each type).
4. Index Ranking: award points to remaining keys based on column cardinality just as in Stats_Recommend.

Workload_Recommend

This procedure uses queries in the workload to recommend indexes. When there is a high confidence in the workload, the choices made here should take precedence over the recommendations from the other procedures.
1. In each query, locate sub-setting predicates (e.g. age>18) and award 2f points where f is the frequency of this query as a fraction of the workload.
2. In each query, locate ordering predicates (ORDER BY, GROUP BY) and award 2f points.
3. Locate possibilities for index-only access (not robust to changes in the workload, so least preferred). For queries that have a frequency greater than 5%, if any of the columns have already been recommended for an index, and the total number of columns referenced in the query is less than 5 and this number is less than half the number of columns in the table, recommend a multi-column index that might allow the optimizer to pick index-only access. Award a score of 2f points.

Explaining Recommendations

In this algorithm, the recommendations are based on a set of rules, generated by hand.

Every time a rule matches a candidate index, the algorithm adds a certain value to its score along with a comment on which rule/reason it was.

The scores are summed up and the indexes are sorted in decreasing order of the score.

The number of indexes recommended per table is limited. This limit is based on the width of the table (number of columns) and optionally a user specified parameter.

Limit indexes to those that score above a cutoff. Report this score and the list of indexes. If required, present the set of reasons associated with this index to the DBA (if he follows a link).

Justification for Design Choices:

Why were heuristics chosen instead of an external cost model in the case of a data-server without an inbuilt index advisor? An external model is a large undertaking, and it might be extremely difficult to arrive at a model that is an accurate common denominator for a variety of existing data-servers without an index advisor. It is difficult also to build an optimizer that can use this model while mimicking different optimizers such as Postgres or Informix. A fairly detailed knowledge of the target optimizers will be required to accomplish this. Furthermore, keeping this optimizer in step with the optimizers of the different servers as they evolve will be an exceedingly complex task. Given the complexity of this task, it is unclear if the returns in terms of the accuracy of predictions from an external model might be commensurate. As a result, a set of detailed heuristics that held true across pretty much any optimizer and cost model were chosen.

Category 2:

Native Index Advisor with No External Virtual Index Support.

In this case, the existing index advisor is exploited if information on the workload is available. If such information is not available, the same strategies as in the previous category are used and heuristic rules are further used.

No Workload (Schema+Stats+Data)

Use same approach as Category 1.

+Workload

When a workload is available, it is submitted to the native index advisor using whatever interface that is available.

1. Workload may be collected from a workload monitoring tool including frequencies.
2. An Eclipse based tool for collecting all the SQL from an application can be extremely useful. When only the application-specific SQL is available, it is used as the workload.
3. Again, the interface provided by the native advisor is used to collect statistics on the potential performance benefits of building the set of recommended indexes.

Category 3:

Native Index Advisor with External Virtual Index Support

This is the category that affords us the greatest amount of flexibility. While the present invention resorts to the same algorithms as Category 1 and Category 2 for the cases when workload information is not available, it has an opportunity for innovative solutions when the workload is provided.

The basic strategy used in a cost-based index advisor that uses the optimizer is to enumerate various sets of potential indexes and estimate the cost of the workload. The useful indexes from the best set can then be recommended for construction. The biggest challenge to overcome here is that it is infeasible to enumerate all possible combinations of indexes and determine the cost of the workload for each. As a result, most index advisors choose an enumeration algorithm that enumerates some subset of these combinations to finish in a limited amount of time.

A few different enumeration algorithms are now described.

Enumeration Algorithms:

Algorithm SIFWI (Simple Indexes First, With Interactions)

All single column indexes of use to each query are considered. For each query, candidate indexes are computed using a Greedy-(2, k) enumeration algorithm. The best configuration is selected. The configuration from each query is unioned to obtain the candidate set for the overall workload. The same Greedy-(2-k) enumeration algorithm can now be used over this overall candidate set to obtain the best index set for the entire workload. After recommending all the single column indexes, proceed to list possible multi-column indexes using columns recommended in the first pass.

This algorithm is likely to be fairly expensive because the enumeration algorithm is run at two levels, and furthermore, the optimizer may be invoked for each index set (configuration) enumerated. The recommendations received from this approach are likely to take into account interactions between pairs of indexes (e.g. Merge-join using two clustered indexes, index intersection). The benefit of using an index is allocated more accurately to that index when you enumerate configurations like this than when you add all possible indexes at once and allocate the time savings to each. If it is believed that index pair interactions are not as important, then the Greedy algorithm is used, and SIFWI becomes a single-column SIF.

Algorithm BIF (Best Indexes First)

For each query, the most useful indexes are located. The cost of the query is explained with existing (possibly none) indexes. The cost of the query is re-explained with all candidate indexes. The computation of the cost benefit ratio of each index is recommended. This is repeated for every query in the workload, and the cost benefit ratio of the indexes is updated. Finally, the indexes are sorted by cost benefit ratio and the best ones are picked until the disk space is exhausted.

This algorithm will likely recommend fat (wide) indexes because of the high cost to benefit ratio. These are likely to be useful to a small set of queries, and more likely to be brittle with respect to changes in the workload. However, in the absence of interactions, this approach should provide better performance than SIF. BIF is also likely to be cheaper than SIFWI. (No enumeration, simple greedy approach to choosing indexes.)

Algorithm BIF-k (Best Indexes First, Remove Recommendations and Repeat)

This strategy is a more expensive version of BIF, where for each query, after finding the recommended indexes, they are removed and the optimizer is run again to locate the next best choices. This is done up to k times to locate the top k choices of the optimizer. The rest of the algorithm is identical to BIF.

This approach will consider a larger set of indexes, and will take into account smaller width indexes that are of benefit to multiple queries more than BIF alone. The cost of this algorithm is probably comparable to SIFWI because the number of optimizer invocations per query here is at most k, while in SIFWI, the number of invocation is quadratic in the number of candidate single column indexes (When Greedy (2,k) is used.)

Algorithm TryVar (Try Variations)

This algorithm may use all the state information available at the end of a BIF run. From the set of the best indexes, a small subset is swapped out for indexes with a lower cost benefit ratio. If the new set has a better overall cost, it is retained, otherwise, it is discarded and the process continues.

This is the algorithm to use if a local optima is close by, and the neighboring region is to be explored.

Algorithm HC (House Cleaning)

Indexes are sorted in decreasing order of size (or if available, increasing order of frequency of use). The index is dropped and the workload is optimized. Then, the impact on cost is examined. After cycling through all the indexes (or as many as possible within the allotted time), indexes having lowest impact on the workload execution time are identified, wherein a recommendation is made for dropping them.

No Workload (Schema+Stats+Data)

Use same approach as Category 1.

+Workload

When the workload is available, a different algorithm is employed based on the scenario that the advisor is being deployed for. TABLE 3 lists different scenarios and good enumeration algorithms for each.

TABLE 3

| | |
|---|---|
| New Application Deployment | Use SIFWI over SQL from new application, subject to INSERT, UPDATE, DELETE from the existing workload that touches tables of interest to new app (Filter out selects from other apps) |
| Revised Application Deployment | Use TryVar (W, W, W+) W is the old workload, W is the SQL removed from old workload, W+ is the SQL new in the workload. Focus on swapping out indexes of use to W-and swapping in indexes of use to w+. Alternative-Use BIF on W+ subject to all the I/U/D statements from W. |
| Fine Tuning | Use BIF-k incremental + TryVar. The assumption is that a set of reasonable (obvious) indexes are already there. These probably came from a recommendation by SIF. BIF will likely find indexes that are more useful to specific queries. |
| Problem Determination | Use BIF-k Incremental. |
| House Cleaning | Use Algorithm HC |

TABLE 3-continued

| | |
|---|---|
| Performance Redesign | SIFWI |
| Application Tuning | Use BIF-k Incremental |

Figure 2:
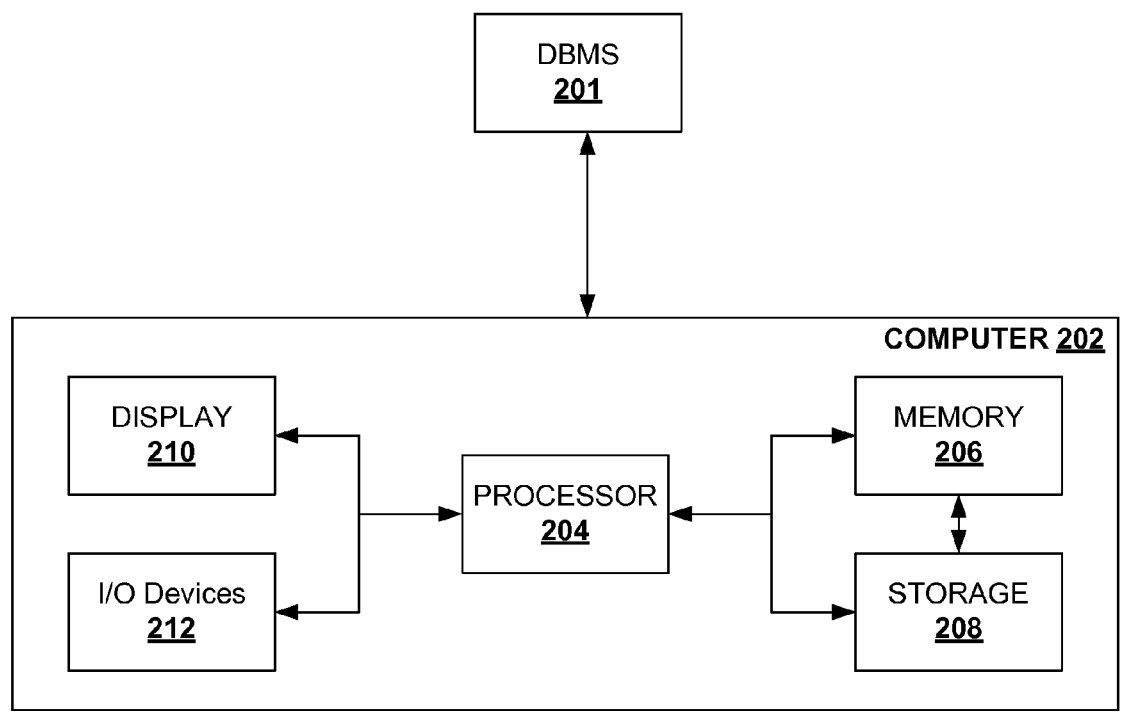
FIG. 2 illustrates a system associated with one embodiment of the present invention.

Other parameters that may be configured:
1. Maximum number of indexes per table
2. Total space allocated to the indexes
3. Total time the advisor may use per invocation Further, an embodiment of the present invention also provides a computer-based system 202 working in conjunction with a database management system (DBMS) 201, as shown in FIG. 2. The computer system 202 shown in FIG. 2 comprises processor 204, memory 206, storage 208, display 210, and input/output devices 212. Storage 208 stores: (a) computer readable program code implementing a client-based index advisor; (b) computer readable program code determining a level of support from a server associated with a DBMS, said level of support picked from any of the following: DBMS with no index advisor support, DBMS with a native index advisor and no external virtual index support, or DBMS with a native index advisor and with an external virtual index support; and (c) computer readable program code: for the case of the DBMS with no index advisor support, recommending at least one potential index based on heuristics, for the case of DBMS with a native index advisor and no external virtual index support, recommending at least one potential index based on invoking the native index advisor; and for the case of DBMS with index advisor and with an external virtual index support, recommending at least one potential index based on enumerating sets of potential indexes and estimating a cost of a workload.

Additionally, an embodiment of the present invention provides for an article of manufacture comprising computer readable program code contained within implementing one or more modules implementing a client-based index advisor. Furthermore, the present invention includes a computer program code-based product, which is a non-transitory computer readable storage medium having program code stored therein which can be used to instruct a computer to perform any of the methods associated with the present invention. The non-transitory computer readable computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in modules are: computer usable program code determining a level of support from a server associated with a database management system (DBMS), wherein the level of support is picked from any of the following: DBMS with no index advisor support, DBMS with a native index advisor and no external virtual index support, or DBMS with a native index advisor and with an external virtual index support; and (1) for the case of the DBMS with no index advisor support, computer usable program code recommending at least one potential index based on heuristics, (2) for the case of DBMS with a native index advisor and no external virtual index support, computer usable program code recommending at least one potential index based on invoking the native index advisor; and (2) for the case of DBMS with index advisor and with an external virtual index support, computer usable program code recommending at least one potential index based on enumerating sets of potential indexes and estimating a cost of a workload.

CONCLUSION

A system and method has been shown in the above embodiments for the effective implementation of a client-based index advisor. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The above enhancements are implemented in various computing environments. For example, the present invention may be implemented on a conventional IBM PC or equivalent, multi-nodal system (e.g., LAN) or networking system (e.g., Internet, WWW, wireless web). All programming and data related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in the art of database programming.

The invention claimed is:
1. A computer program product comprising:
a non-transitory computer readable storage medium having computer readable program code for complementing a server-based index adviser with a client-based index advisor, said computer program product including:
computer readable program code determining a level of support from a server associated with a database management system (DBMS), said DBMS with a native index advisor and with external virtual index support;
computer readable program code recommending at least one potential index based on enumerating sets of potential indexes and estimating a cost of a workload, wherein enumeration is done via an optimizer as a combination of a best indexes first and try variation algorithm as follows:
computer readable program code locating candidate indexes,
computer readable program code determining a cost of each query with existing indexes, re-determining the cost of each query with all candidate indexes,
computer readable program code computing a cost benefit ratio of each index in said candidate indexes, wherein the steps of locating, determining, re-determining, and computing are repeated for every query in the workload and the cost benefit ratio of the candidate indexes is updated, and candidate indexes are sorted by cost benefit ratio and highest efficiency ones are picked until disk space is exhausted wherein, after highest efficiency indexes are picked, they are removed and said optimizer is run k times to locate next best choices for up to k times to locate top k choices for said optimizer,
computer readable program code swapping a small subset from said k-choices for indexes with a tower cost benefit ratio, and if the new set has a higher overall cost benefit ratio than the previous set of highest efficiency indexes, it is retained, otherwise, computer readable program code discarding the new set and utilizing the previous set of highest efficiency indexes; and computer readable program code outputting results of the enumeration.

2. A system comprising:

a database management system (DBMS);

a computer system comprising a processor and storage, said storage storing:

computer readable program code implementing a client-based index advisor;

computer readable program code determining a level of support from a server associated with a DBMS, said DBMS with a native index advisor and with external virtual index support;

computer readable program code recommending at least one potential index based on enumerating sets of potential indexes and estimating a cost of a workload, wherein enumeration is done via a combination of a best indexes first and try variation algorithm as follows:

computer readable program code locating candidate indexes, computer readable program code determining a cost of each query with existing indexes, re-determining the cost of each query with all candidate indexes, computer eadable program code computing a cost benefit ratio of each index in said candidate indexes, wherein the steps of locating, determining, re-determining, and computing are repeated for every query in the workload and the cost benefit ratio of the candidate indexes is updated, and candidate indexes are sorted by cost benefit ratio and highest efficiency ones are picked until disk space is exhausted wherein, after highest efficiency indexes are picked, they are removed and said optimizer is run k times to locate next best choices for up to k times to locate top k choices for said optimizer, computer readable program code swapping a small subset from said k-choices for indexes with a lower cost benefit ratio, and if the new set has a higher overall cost benefit ratio than the previous set of highest efficiency indexes, it is retained, otherwise, computer readable program code discarding the new set and utilizing the previous set of highest efficiency indexes; and computer readable program code outputting results of the enumeration.

3. A computer-based method implemented by a processor executing computer readable program code stored in non-transitory computer readable storage medium for complementing a server-based index adviser with a client-based index advisor, said computer-based method comprising:

computer readable program code executed by the processor and determining a level of support from a server associated with a database management system (DBMS), said DBMS with a native index advisor and with external virtual index support;

computer readable program code executed by the processor and recommending at least one potential index based on enumerating sets of potential indexes and estimating a cost of a workload, wherein enumeration is done via a combination of a best indexes first and try variation algorithm as follows:

computer readable program code executed by the processor and locating candidate indexes, computer readable program code executed by the processor and determining a cost of each query with existing indexes, re-determining the cost of each query with all candidate indexes, computer readable program code executed by the processor and computing a cost benefit ratio of each index in said candidate indexes, wherein the steps of locating, determining, re-determining, and computing are repeated for every query in the workload and the cost benefit ratio of the candidate indexes is updated, and candidate indexes are sorted by cost benefit ratio and highest efficiency ones are picked until disk space is exhausted wherein, after highest efficiency indexes are picked, they are removed and said optimizer is run k times to locate next best choices for up to k times to locate top k choices for said optimizer, computer readable program code executed by the processor and swapping a small subset from said k-choices for indexes with a lower cost benefit ratio, and if the new set has a higher overall cost benefit ratio than the previous set of highest efficiency indexes, it is retained, otherwise, computer eadable program code discarding the new set and utilizing the previous set of highest efficiency indexes; and computer readable program code executed by the processor and outputting results of the enumeration.

\* \* \* \* \*